E. A. KERSTEIN.
INDICATING ADJUNCT FOR GAS METERS.
APPLICATION FILED JAN. 6, 1917.
1,244,340.
Patented Oct. 23, 1917.
2 SHEETS—SHEET 1.
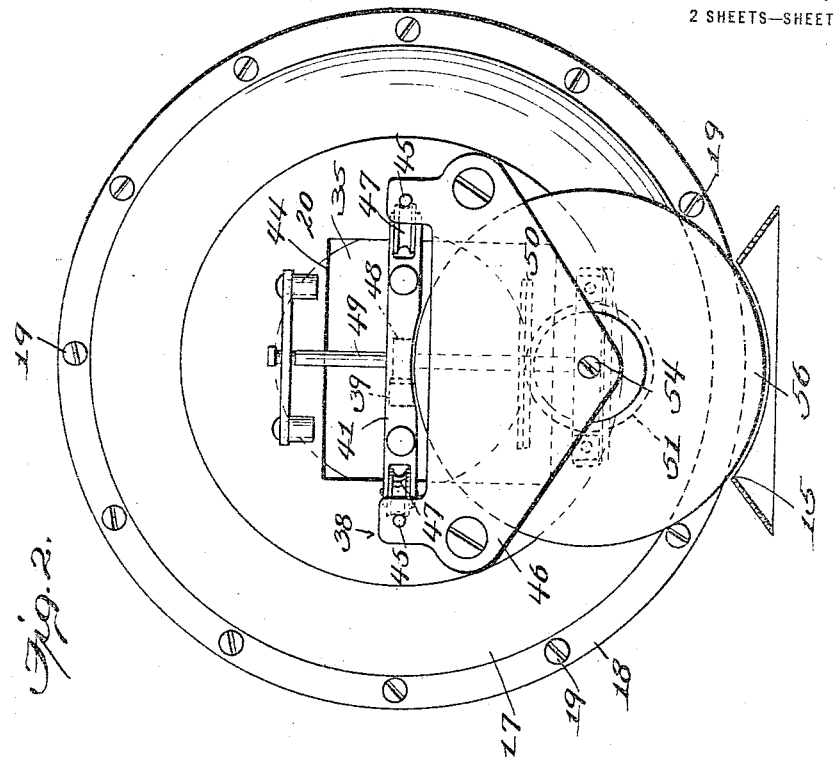
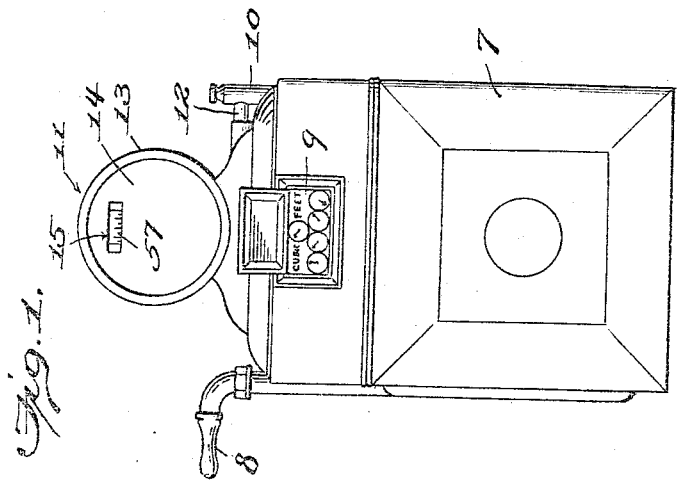
Witness
C. A. Kesler
M. E. McAde.
Inventor
Ernest Kerstein
By James L. Norris
Attorney

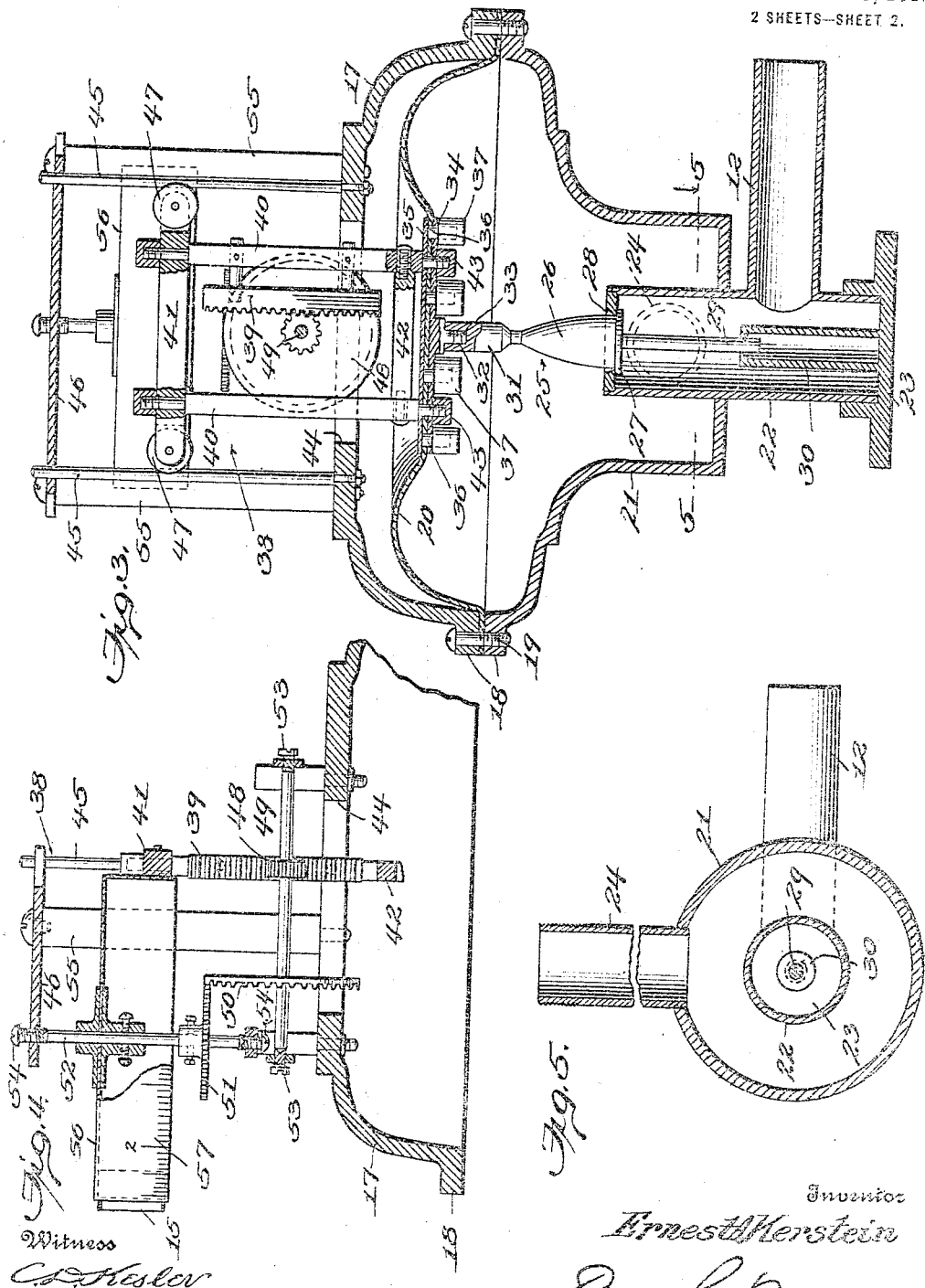

UNITED STATES PATENT OFFICE.

ERNEST A. KERSTEIN, OF UNION, NEW JERSEY, ASSIGNOR TO AMERICAN METER CO., OF NEW YORK, N. Y., A CORPORATION OF DELAWARE.

INDICATING ADJUNCT FOR GAS-METERS.

1,244,340.  Specification of Letters Patent.  Patented Oct. 23, 1917.

Application filed January 6, 1917. Serial No. 141,033.

*To all whom it may concern:*

Be it known that I, ERNEST KERSTEIN, a citizen of the United States, residing at town of Union, in the county of Hudson and State of New Jersey, have invented new and useful Improvements in Indicating Adjuncts for Gas-Meters, of which the following is a specification.

This invention relates to indicating adjuncts for gas meters, and it comprises, briefly, an improved mechanism of the general character specified, which is designed for connection with, a gas meter to directly indicate either the cost in cents per hour of operating an appliance with which the meter is used, or the volume of gas consumed per hour by such appliance, as determined by the rate of flow through the meter.

According to the invention, the gas, on passing through the meter, is delivered to a chamber or reservoir, containing a flexible diaphragm which is connected to the indicating mechanism proper. This diaphragm is controlled in its movements by the volume of gas in the aforesaid reservoir, and, in turn, controls the operation of the indicating mechanism in synchronism therewith, so that the dial of the latter will show either of the two amounts above referred to, according to the character of its graduations or markings. The invention resides primarily in the construction, arrangement and mounting of the indicating mechanism, and its mode of operation by the diaphragm, and in the devices provided for automatically regulating the flow of gas into and through the reservoir, all as hereinafter set forth.

An embodiment of the invention is illustrated in the accompanying drawing, whereof:—

Figure 1 is a front elevation of a meter equipped with the improved indicating adjunct.

Fig. 2 is an enlarged plan view of the adjunct itself, showing the side walls of the sight opening in section.

Fig. 3 is a vertical section.

Fig. 4 is a fragmental vertical section at right angles to Fig. 3.

Fig. 5 is a horizontal section on line 5—5, Fig. 3.

Referring more particularly to said drawing, 7 indicates, generally, a gas meter of the ordinary or standard type, which the gas enters through the inlet pipe 8 and traverses in the usual manner, during which time the dial mechanism 9 of the meter is actuated. The ordinary outlet 10 is also provided; but instead of passing through this outlet to the service connection, the gas flows into the interior of the indicating adjunct 11 about to be described, the outlet being connected to the latter by a short horizontal pipe 12, which thus constitutes the inlet for the adjunct.

The aforesaid indicating adjunct is here shown as mounted upon the top of the meter, its various mechanisms being arranged within a casing 13, through the base of which the pipe 12 leads. The front portion of this casing is closed by a dial plate 14 of cardboard, metal or other suitable material, provided with a sight opening 15, through which the readings of the indicating mechanism are taken. As shown in Figs. 2, 3 and 4, the casing 13 contains a hollow case, chamber or reservoir 17, whose upper and lower members are provided with laterally-projecting marginal flanges 18 that are fastened together by bolts 19, or the like, said flanges serving as clamps for the edge of a flexible diaphragm 20 disposed within the reservoir, the arrangement being such as to form a gas-tight joint extending entirely around the chamber at the point specified. The lower member of the said chamber is provided with a central, depending contraction or throat 21, through whose bottom wall a tubular neck 22 projects upwardly into the interior of the chamber, the lower end of said neck being fixed to a suitable base plate 23. The inlet pipe 12, above referred to, opens into this neck or passage 22 below the bottom of the throat 21, and from the latter there leads, in turn, a horizontal pipe 24, which extends through the casing 13 and, therefore, constitutes the gas outlet for the entire apparatus, being connected for that purpose by a service pipe, (not shown), with the appliance to be tested.

The gas, on leaving the meter, will, therefore, flow through the pipes 10, 12 and 22, and will enter the reservoir chamber 17 by way of the last-named pipe or passage, as will be understood; and since the desired readings, (either the cost in cents per hour, or the volume of gas flowing through the meter per hour), are based upon the rate of flow, it becomes necessary, therefore, to provide some means or device for controlling the rate of flow, and for synchronizing the action of the indicating mechanism accordantly therewith. In the construction illustrated, the first object mentioned is effected by means of a valve 25, which is connected to the diaphragm 20 to move therewith. This valve, as shown, is formed with a body portion 26 which tapers gradually from its lower to its upper end and is provided at its said lower end with a circumferential flange or shoulder 27, said body working through an opening 28 formed in the top wall of the neck or tube 22, the wall of the opening being outwardly beveled, as shown. The lower diameter of the said opening is slightly less than that of the flange 27, so that the latter thus functions as a stop or check to limit the upward movement of the valve. The valve is guided in its movements by means of its axial lower portion or stem 29, which projects downwardly from the valve body and has a sliding fit in an upright sleeve 30, the latter forming part of the base 23. It will thus be seen that as the valve rises, the annular passage between its body portion and the wall of the opening 28 will be gradually constricted, and will be completely closed or cut out when the valve reaches its upper limit of movement. Conversely, when the valve drops, this passage will become gradually enlarged, and will attain its greatest area when the valve terminates its downward movement, at which time the base of the valve engages the top of the sleeve 30.

The movements of the valve are effected and controlled by the flexure of the diaphragm 20, which, in turn rises and falls accordantly with the variations in the volume of gas contained in the reservoir chamber 17. For this purpose, the upper portion 31 of the valve is formed with a threaded socket 32 for the reception of a depending, threaded pin or lug 33, which is formed on or secured to a clamping plate 34 that is disposed against the lower surface of the diaphragm. The plate 34 coacts with a companion upper plate 35 that is disposed against the upper surface of the diaphragm, the two plates being fastened together by depending pins or lugs 36, that pass through openings in the lower plate and the diaphragm and are engaged by cap nuts 37, (Fig. 3). Owing to the connection of the inlet pipe 12 with the meter, it will be apparent that under normal conditions, gas will flow into the reservoir chamber from the meter and will expand or raise the diaphragm until the chamber is completely filled, when the valve will occupy its upper or closed position, thereby cutting off any further flow of gas from the meter, it being understood, of course, that at such time there is no exhaust from the chamber, since the service pipe connected with the outlet pipe 24 is equipped with a controlling valve which is normally closed. When, however, the valve just mentioned is opened, the gas contained in said chamber will be gradually exhausted therefrom, the diaphragm and its valve 25 will drop, and gas will again flow from the meter into the chamber.

The indicating mechanism is actuated and controlled by and in accordance with the movements of the diaphragm, as previously stated, for which reason its operating parts are mounted upon the diaphragm to rise and fall therewith. Preferably, these operating parts comprise a vertical frame or cage 38, carrying an upright rack 39 which, during the movements of the frame, operates the indicating mechanism proper through the intermediary of a suitable gear train, as hereinafter described. The frame or cage 38 is here shown as consisting of a pair of spaced uprights 40, connected by upper and lower cross-pieces 41 and 42, the threaded lower ends of the uprights extending through registering openings in the clamping plates 35 and 34 and the diaphragm, and being held in place by cap nuts 43. The cage projects upwardly through an opening 44 in the upper member of the reservoir casing, and is designed for sliding engagement with a pair of vertical guide posts 45 affixed to said member at opposite sides of such opening, and having their upper ends connected by a plate 46, these posts being engaged by rollers 47 carried by the ends of the upper cross-piece 41.

The rack 39 is directly connected to one of the uprights 40, and is constantly engaged with a gear 48 fixed to a horizontal shaft 49, (Fig. 4), the latter extending across the opening 44. The shaft 49 also carries a crown gear 50, whose diameter greatly exceeds that of the gear 48, this gear 50 meshing with and driving a similar gear 51 that is carried by a vertical shaft 52. The shafts 49 and 52 may be supported and journaled in any desired manner, but preferably their ends are engaged in bearing screws 53 and 54, which are themselves supported in some suitable way, the upper bearing screw for the vertical shaft 52 being mounted in the top plate 46, which is directly fastened upon a second pair of upright posts 55, located slightly in front of the posts 45.

The indicating mechanism proper is carried by the shaft 52, and it consists, in this instance, of a cylindrical drum 56, whose peripheral wall is provided with a scale 57, the latter being graduated in the proper manner to indicate either the cost or the volume per hour of the gas flowing through the meter. The drum is adjustable on the said shaft 52, in order to enable it to be brought directly opposite the sight opening 15, and its scale 57 is removable therefrom to be replaced by a scale graduated in units of a different character, or with its computations based upon a different rate of cost. The gear 51 is also removable from shaft 52, and is adapted to be replaced by gears having a greater or lower number of teeth, according as the price of the gas changes. The rotation of shaft 52 is caused by that of the horizontal shaft 49, through the intermeshing gears 50 and 51, the latter shaft deriving its movement from the rack 39, which is carried up and down with the cage or frame 38; and since the latter is normally disposed at its upper limit of movement, the scale will be so arranged with respect to the drum 56 as to normally display its zero point at the center of the sight opening.

The operation is substantially as follows:—The range, lamp, or other gas appliance to be tested, is connected up to the outlet pipe 24, the burner valve opened and the burner lighted. Gas then commences to exhaust from the reservoir chamber 17, thereby decreasing the pressure below the diaphragm. The latter then gradually drops, due to the weight of the cage and associated parts connected to it, and as it drops, causes the valve 25 to move downward likewise, the movement of the valve 25 gradually uncovering and enlarging the passage 28, with the result that gas flows into the reservoir from the meter through the parts 10, 12 and 22. As the flow of gas from the reservoir increases, the cage or frame moves downward with the diaphragm, and its rack 39 rotates the gear 48, thereby driving the gear train, of which said gear 48 forms a part, and producing, in consequence, the actuation of the indicating drum, the readings on whose scale are visible through the sight opening. This reading directly indicates the exact cost or volume per hour of the gas passing through the meter, as based upon the particular rate of flow at the time when the reading is taken, no further calculation being necessary. Consequently, the burner need only be kept lighted a comparatively short time, so that the cost of the test to the demonstrator is extremely low. The reading changes, of course, as the rate of flow varies. Thus, if more gas is turned on, the amount of the reading increases, due to the continued rotation of the drum; while, similarly, if the gas supply at the appliance is lowered, gas will accumulate in the reservoir, with the result that the diaphragm is expanded, the cage or frame raised, and the drum is rotated backward. If the rate of flow remains constant, no change in the reading takes place, since in such case the pressures on both sides of the diaphragm are balanced. As soon as the burner is extinguished, the reservoir refills, and the scale returns to zero position, the supply being shut off automatically when the opening 28 is closed by the valve 25.

I claim as my invention—

1. An indicating adjunct for fluid meters, comprising, in combination, a reservoir chamber provided with an inlet and an outlet for the fluid, the former supplied from the meter; a diaphragm within said chamber governed as to its movements by the pressure of the fluid therebeneath, said inlet communicating with said chamber below said diaphragm; a depending valve for controlling the flow of liquid through said inlet connected to the under side of said diaphragm to be operated thereby; and an indicating mechanism having its operating part mounted upon the upper side of said diaphragm to be actuated by the same.

2. An indicating adjunct for fluid meters, comprising, in combination, a reservoir chamber supplied from the meter; an indicating mechanism embodying a movable graduated scale, and means for automatically moving said scale accordantly with the rate of flow of the fluid through said chamber and by the action of the fluid itself.

3. An indicating adjunct for fluid meters, comprising, in combination, a reservoir chamber supplied from the meter; an indicating mechanism embodying a rotatable scale, and a train of gearing for operating it; and means for automatically driving said train accordantly with the rate of flow of the fluid through said chamber and by the action of the fluid itself.

4. An indicating adjunct for fluid meters, comprising, in combination, a reservoir chamber supplied from the meter; an indicating mechanism embodying a movable scale, a supporting member therefor, and a driving train leading to said member; a reciprocatory operating element for said train; and means for automatically actuating said operating element accordantly with the rate of flow of the fluid through said chamber and by the action of the fluid itself.

5. An indicating adjunct for fluid meters, comprising, in combination, a reservoir chamber supplied from the meter; an indicating mechanism embodying a rotatable scale, a supporting shaft therefor, and a driving train leading to said shaft; a rising and falling rack for operating said train; and means for automatically actuating said rack accordantly with the rate of flow of the fluid through said chamber and by the action of the fluid itself.

6. An indicating adjunct for fluid meters, comprising, in combination, a reservoir chamber supplied from the meter; an indicating mechanism embodying a movable scale; a fluid-controlled diaphragm within said chamber; means for controlling the supply of fluid to said chamber; and means operated by the movements of said diaphragm for moving said scale.

7. An indicating adjunct for fluid meters, comprising, in combination, a closed reservoir chamber supplied from the meter; an indicating mechanism embodying a movable scale; means for controlling the supply of fluid to said chamber; and a fluid-controlled diaphragm within said chamber connected to operate said scale and said controlling means in synchronism.

8. An indicating adjunct for fluid meters, comprising, in combination, a reservoir chamber supplied from the meter; an indicating mechanism embodying a movable scale, a supporting member therefor, and a driving train leading to said member; a reciprocatory operating element for said train; means for controlling the supply of fluid to said chamber; and a fluid-controlled diaphragm within said chamber connected to actuate said operating element and said controlling means in synchronism.

9. An indicating adjunct for fluid meters, comprising, in combination, a reservoir chamber supplied from the meter; an indicating mechanism embodying a rotatable scale, a supporting shaft therefor, and a driving train leading to said shaft; a rising and falling rack for operating said train; means for controlling the supply of fluid to said chamber; and a fluid-controlled diaphragm within said chamber connected to actuate said rack and said controlling means in synchronism.

10. An indicating adjunct for fluid meters, comprising, in combination, a reservoir chamber provided with a tubular inlet pipe having an opening in its discharge end; a valve working in said opening for controlling the flow of fluid therethrough; an indicating mechanism; and a fluid-controlled member within said chamber connected to operate said indicating mechanism and said valve in synchronism.

11. An indicating attachment for fluid meters, comprising, in combination, a reservoir chamber in communication with a source of fluid supply; a vertical frame mounted upon said chamber; an indicating mechanism mounted within said frame and embodying a movable scale and operating means therefor; means for controlling the supply of fluid to said chamber; a fluid-controlled diaphragm within said chamber connected to actuate said controlling means; a rising and falling cage mounted on said diaphragm and guided within said frame; and an element for actuating said scale-operating means mounted in said cage to move therewith.

12. An indicating attachment for fluid meters, comprising in combination, a reservoir chamber in communication with a source of fluid supply; a vertical frame mounted upon said chamber; a vertical shaft and a horizontal shaft journaled in said frame and having inter-meshing gears; a scale fixed to the vertical shaft to rotate therewith; a second gear on the horizontal shaft; means for controlling the supply of fluid to said chamber; a fluid-controlled diaphragm within said chamber connected to actuate said controlling means; a rising and falling cage mounted on said diaphragm and guided within said frame; and an endwise-movable, vertical rack meshing with and driving the second gear on said horizontal shaft and connected to move with said cage.

13. An indicating attachment for fluid meters, comprising, in combination, a reservoir chamber in communication with a source of fluid supply; a vertical frame mounted up said chamber; a vertical shaft journaled in said frame; a rotary scale carried by said shaft; a driving train for said shaft mounted in said frame; means for controlling the supply of fluid to said chamber; a fluid-controlled diaphragm within said chamber connected to actuate said controlling means; a rising and falling cage mounted on said diaphragm and guided within said frame; and an endwise-movable, vertical element for actuating said driving train mounted in said cage to move with the same.

In testimony whereof I have hereunto set my hand in presence of two subscribing witnesses.

ERNEST A. KERSTEIN.

Witnesses:
MAX A. HOLLANDER,
JOHN GLUECK, Jr.